(12) United States Patent
Spaid et al.

(10) Patent No.: US 6,295,708 B1
(45) Date of Patent: Oct. 2, 2001

(54) TIP CLEANING SYSTEM FOR WELDING NOZZLE

(75) Inventors: Dennis A. Spaid, 6300 Inland Shores Dr., Mentor, OH (US) 44060; James D. Floro, 555 Park Rd., Painesville, OH (US) 44077; Robin Longenecker, New Hudson, MI (US)

(73) Assignees: James D. Floro, Painesville; Dennis A. Spaid, Mentor, both of OH (US)

( * ) Notice: Subject to any disclaimer, the term of this patent is extended or adjusted under 35 U.S.C. 154(b) by 0 days.

(21) Appl. No.: 09/571,930

(22) Filed: May 16, 2000

(51) Int. Cl.$^7$ ...................................... B21B 45/04
(52) U.S. Cl. ...................... 29/81.15; 29/81.02; 29/81.021
(58) Field of Search ............................... 29/81.15, 81.13, 29/81.02, 81.021, 81.01

(56) References Cited

U.S. PATENT DOCUMENTS

| | | | |
|---|---|---|---|
| 801,515 | * 10/1905 | Ehrhardt | 29/81.021 |
| 1,860,826 | 5/1932 | Tschudi . | |
| 1,924,946 | 8/1933 | Kott | 153/48 |
| 2,044,561 | * 6/1936 | Bidle | 29/81.15 |
| 2,211,741 | 8/1940 | Elwell | 74/56 |
| 2,310,703 | * 2/1943 | McGlincy | 29/527.6 |
| 2,610,350 | * 9/1952 | Smith | 29/81.021 |
| 3,067,487 | * 12/1962 | Vindum | 29/81.15 |
| 3,160,217 | 12/1964 | Raihle | 173/94 |
| 3,587,754 | 6/1971 | Laatsch | 173/117 |
| 4,051,342 | * 9/1977 | Stubbings | 219/60 A |
| 4,242,780 | * 1/1981 | Littman | 7/144 |
| 4,805,826 | * 2/1989 | Moriki et al. | 228/18 |
| 5,251,367 | * 10/1993 | Ward et al. | 29/81.15 |
| 5,465,483 | 11/1995 | Fink et al. | 29/890 |
| 5,816,986 | * 10/1998 | Luecke et al. | 483/20 |
| 5,983,430 | * 11/1999 | Clark | 7/144 |

\* cited by examiner

Primary Examiner—S. Thomas Hughes
Assistant Examiner—Marc Jimenez
(74) Attorney, Agent, or Firm—James A. Lucas; Driggs, Lucas, Brubaker & Hogg Co. L.P.A.

(57) ABSTRACT

An apparatus and a method are described for dislodging and removing welding slag from the tip of an electric arc welder, particularly a robotically controlled welder. When a torch finishes its welding cycle, it is moved to a designated cleaning point where it is positioned between two positioning blocks. A double lobed cam on the output shaft of a reciprocating air motor turns against a cam follower. The cam causes the cam follower to compress a spring during the lift portion of the cam cycle, and allows the spring to drive the hammer into impact with the tip during the fall portion of the cycle The repeated impact with the tip serves to loosen the slag from the nozzle. The slag then falls and is collected in a basket located beneath the positioning blocks. The motor rotates at a speed of about 200–1000 rpm to move the hammer about 3/16" for a cleaning cycle of about 5–10 seconds. The apparatus also includes a positioning device for training a welding robot to precisely locate the impact area for a given size and shape of welding nozzle tip.

10 Claims, 7 Drawing Sheets

TIP CLEANING SYSTEM FOR WELDING NOZZLE

THE FIELD OF THE INVENTION

This invention relates to the field of welding. More specifically, the invention relates to the removal of the slag from the tip of a MIG welding torch nozzle.

BACKGROUND OF THE INVENTION

Welding is used for many purposes, the most common being to join two pieces of metal together. In such a process, the abutting edges of the two pieces of metal are heated to an elevated temperature until they become molten, and a bead of molten metal is flowed from a welding rod or electrode along the molten edges to fuse the edges together. When the metal cools, it solidifies to form a unitary bond.

Many types of welding systems have been developed over the years. The most common are electric arc welding and gas welding. The present invention deals with gas metal arc welding (referred to as MIG). The MIG welding process is described in numerous articles, such as Gas Metal-Arc Welding (MIG Welding) by the ASM Committee on Gas Metal-Arc Welding and Flux-Cored Arc Welding of Steel, published in Metals Handbook, Vol. 6, Welding & Brazing, $8^{th}$ Edition (1971). This article describes MIG welding as a process in which the heat for welding is generated by an arc between a consumable electrode and the work metal. The electrode is a bare solid wire that is continuously fed to the weld area and becomes a filler metal as it is consumed. The electrode, weld puddle, arc and adjacent areas of the base metal are protected from atmospheric contamination by a gaseous shield provided by a gas stream comprising a mixture of inert gases, typically a mixture of 90% argon and 10% carbon dioxide. During the process, the heat and the electric current causes the molten metal to splatter. Some of the splatter gets into the interior of the welding nozzle where it solidifies as slag on the interior wall. The slag, if allowed to continue to build up, reduces the size of the inner bore and smoothness of the nozzle, resulting in a reduction of gas flow and an alteration in the flow dynamics of the weld nozzle tip.

In the past, attempts have been made to prevent the build-up of slag in the nozzle tip by dipping the tip of the nozzle in a liquid such as a solution called Anti-Spat. Various means have also been tried to remove the slag, such as a rotating ream inserted into the nozzle tip to mechanically scrape the slag from the interior of the nozzle. Another technique has been to vibrate the nozzle tip in an effort to remove slag and other debris. In each case, the procedure requires a shutdown of the entire welding line so that the slag can be removed. Thus, the procedure has tended to be costly and time-consuming, particularly in automated production lines utilizing welding robotics.

BRIEF DESCRIPTION OF THE INVENTION

It is an objective of the present invention to provide a controlled method and apparatus for overcoming the drawbacks in the prior art procedures.

It is another objective to provide a controlled method and apparatus for rapidly and efficiently removing slag build-up in welding nozzles.

These and other objectives and advantages which will become evident upon a full understanding of the invention are achieved in the manner to be hereinafter described in detail.

This invention relates to an apparatus and the process for cleaning welding nozzles, and in particular welding nozzles used with gas metal arc welding (MIG) processes. The apparatus comprises holder means, such as a cradle, for positioning the tip of a nozzle at a fixed location away from the welding site and for preventing the nozzle from falling off. It also includes a hammer having a first end, and an impact face at the second end, and means to controllably, rapidly and repeatedly strike the hammer against the welding nozzle tip to dislodge slag from the nozzle and permit the slag to drop into a basket located beneath the cradle. Preferably, a double lobe, fast fall cam is mounted on the output shaft of a reciprocating air motor. A cam follower is connected to the first end of the hammer opposite the impact face. As each cam lobe rises, the cam follower withdraws the impact face of the hammer from the impact area. A compressed coil spring serves to rapidly drive the hammer into contact with the nozzle tip each time the cam falls and the cam profile is at a minimum.

The invention is useful with programmable robotic welders, and includes a simplified means of training the robotic welder to precisely position the nozzle tip in the holder during each cleaning cycle. This 'training' involves the use of a toggle including a lever and a pusher to displace the impact face of the hammer a small distance (about $\frac{1}{18}$") from the impact area, placing the tip of the nozzle against the displaced impact face, whereupon the robotics thereafter remember the precise location for placement of the tip at the start of each cycle.

DETAILED DESCRIPTION OF THE INVENTION

Figure 3:
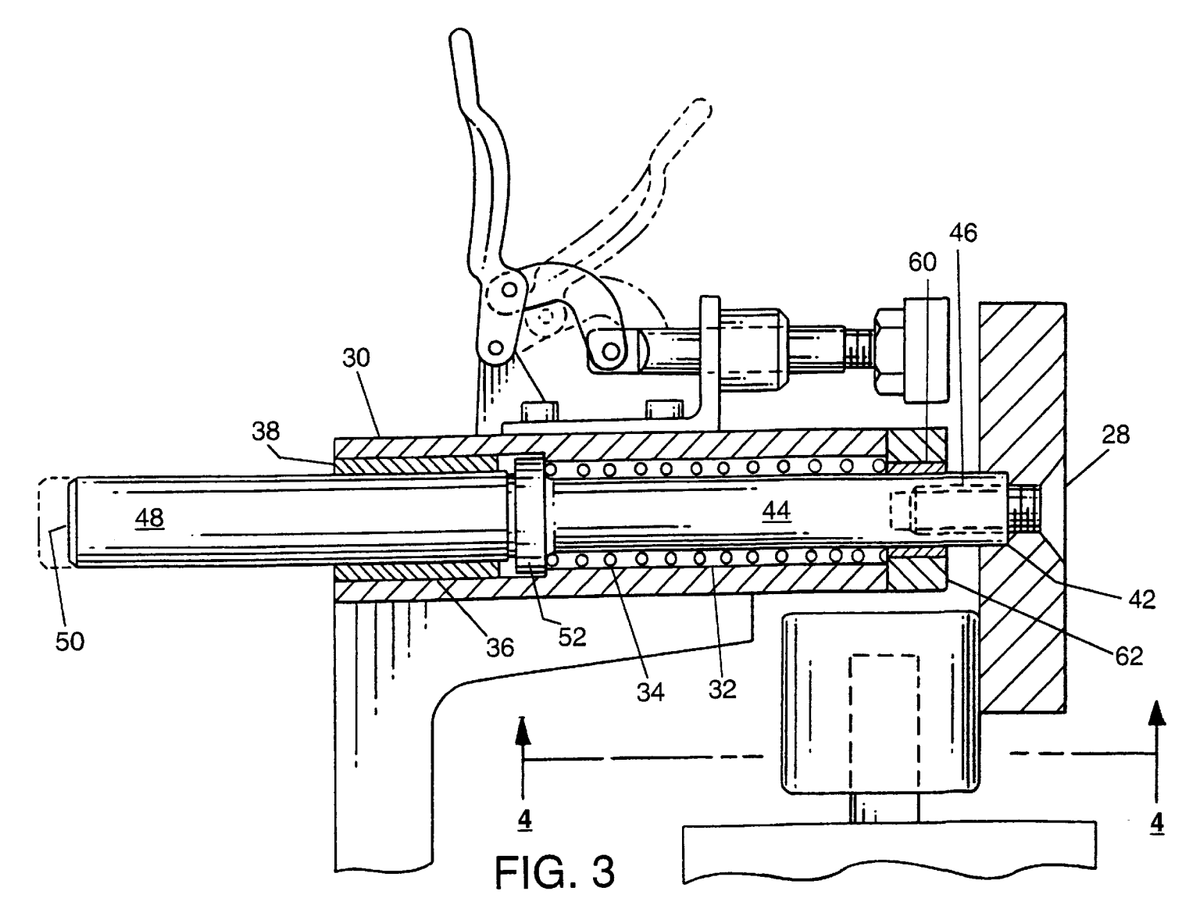
FIG. 3 is an enlarged sectional view showing the hammer and toggle clamp assemblies.

Referring now to the drawings, the present invention shows a torch cleaner 10 comprising a housing 12 containing an air motor 14 such as a Gast brand NL 32-NCC-2 non-lubricated motor. The housing typically is made from a corrosion resistant material such as stainless steel. A double lobe, fast fall cam 18, typically made from a D-2 material heat treated to 58–62 Rockwell C hardness, is secured by conventional means, such as set screws (not shown), to the shaft 16 of the motor. Each lobe 20 of the cam contacts cam follower 22. The cam follower 22 preferably comprises a machined bronze disc having a central bore 24. The cam follower 22 is joined to a hammer 26 with a suitable threaded connection, such as a self-locking screw 28 (FIG.

Figure 6:
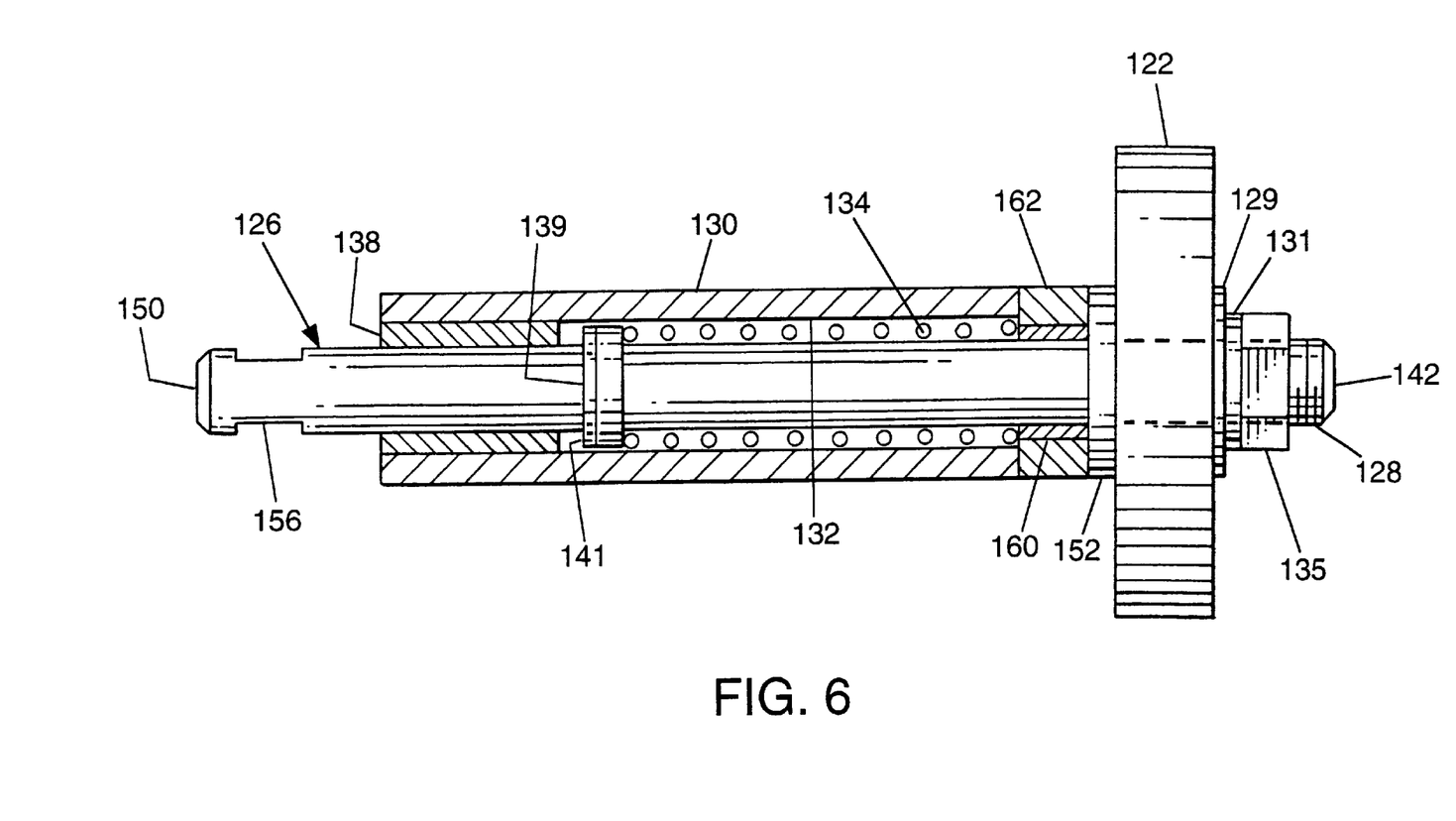
FIG. 6 show another embodiment of the present invention.

3) or a nut 135 threaded onto the threads 128 at the first end of the hammer 126 (FIG. 6). The hammer is moved by the cam follower in a linear direction within a hammer housing 30.

Figure 4A:
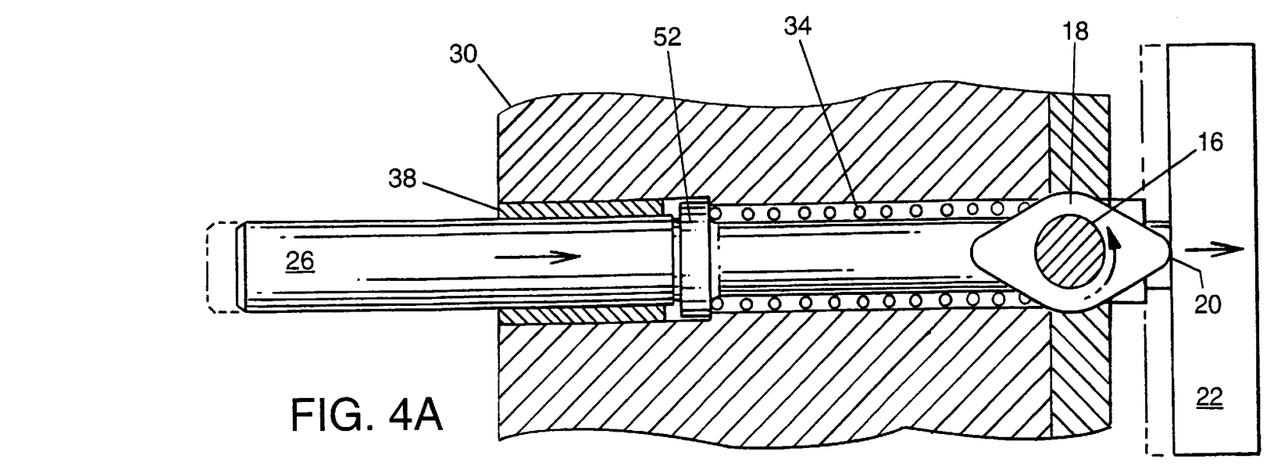
FIG. 4A is a sectional view as taken through section 4—4 on FIG. 3 showing the hammer and the cam in the pull-back position.
Figure 4B:
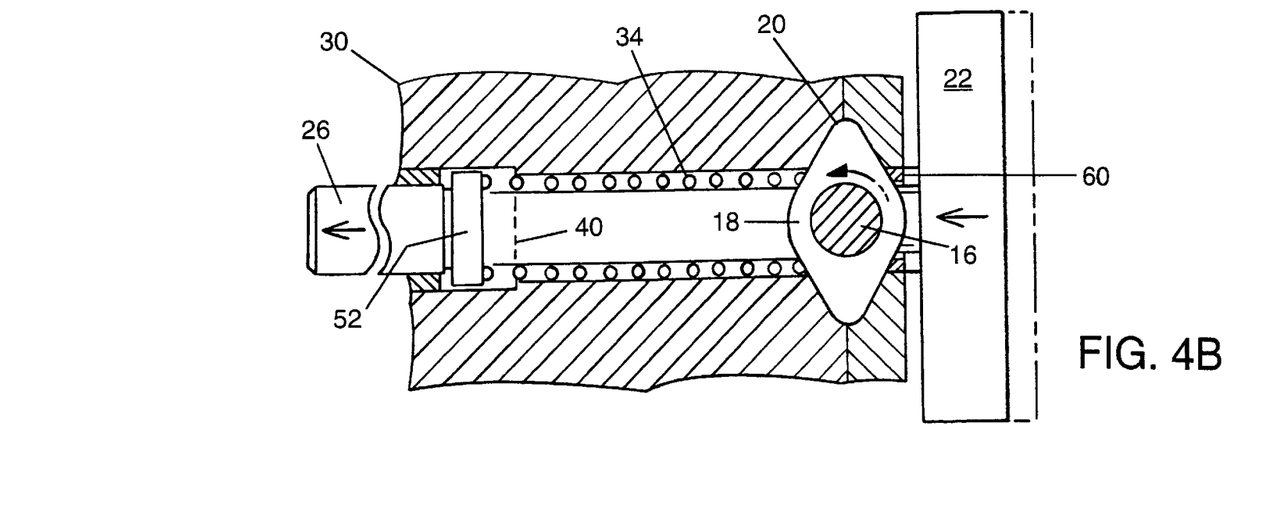
FIG. 4B is a sectional view showing the hammer and the cam in the hammer position.
Figure 5A:
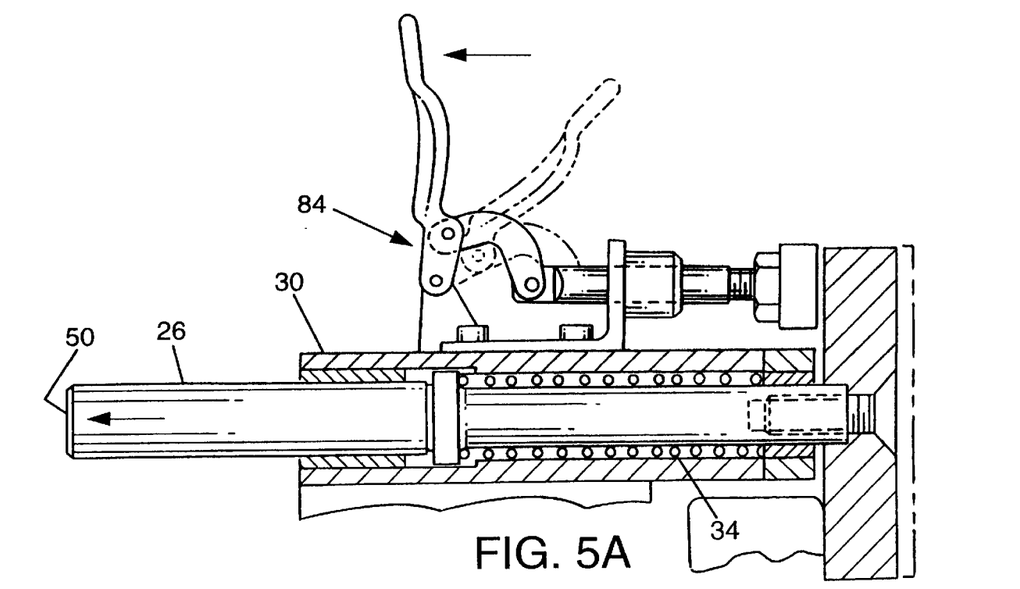
FIG. 5A is a sectional view showing the toggle clamp in the run position.
Figure 5B:
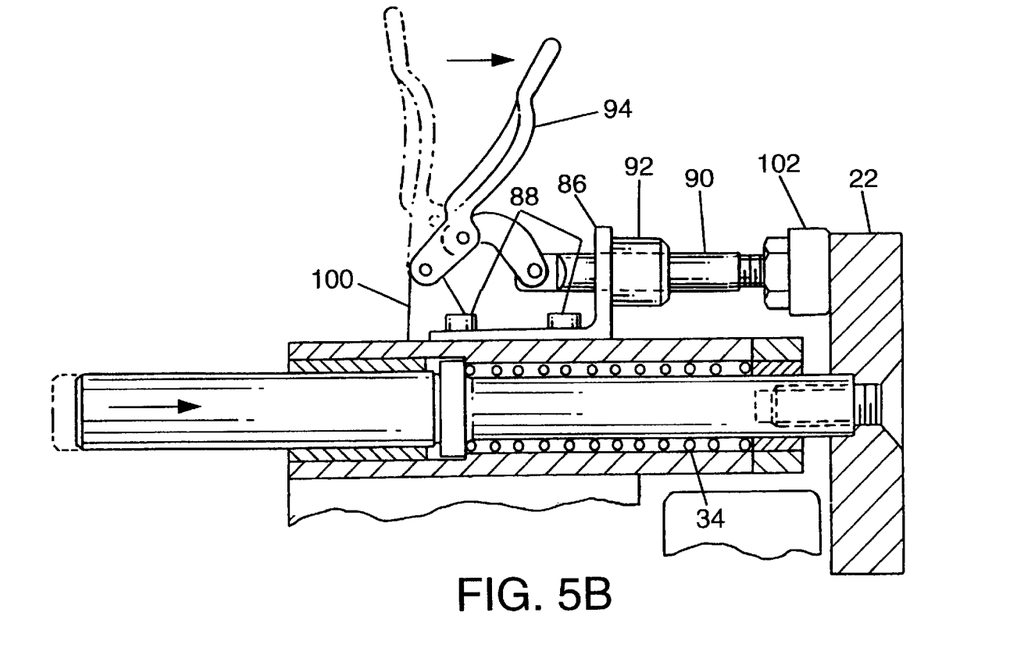
FIG. 5B is a sectional view showing the toggle clamp in the train position.

In a first embodiment shown in FIGS. 3–5, the housing is bored out to a first, smaller diameter bore hole 32 to receive a coiled compression spring 34 and a second, larger diameter bore hole 36 to accept a self lubricated bronze bushing 38. A shoulder 40 is formed at the junction of the bore holes 32,36. The hammer includes a first end 42 and a first cylindrical portion 44 extending from the first end. A threaded hole 46 is tapped into the first end. A second cylindrical portion 48 terminates in a second end that comprises the impact face 50 of the hammer. The two cylindrical portions are separated by a flange 52 that provides a positive stop against the end of the bushing 38 when the hammer is fully extended and withdrawn. The hammer typically is made from 4140 pre-heat treated steel to a Rockwell C hardness of 28–32. Alternatively, D-2 steel having a Rockwell C hardness of 58–62 can be used.

The compression spring 34 surrounds the first cylindrical portion 44 of the hammer 26 in the first bore hole 32. One spring that has been found to be suitable is one having about 14 pounds per inch of compression. The spring is held in place under compression by a retaining plate 62, and the first bushing contained in the hole 64 in the plate. The inner diameter of the bushing 34 receives the first end 42 of the hammer with a clearance sufficient to allow the hammer to move without binding. The retaining plate 62 is secured into the hammer housing 12 by machine screws or other suitable fasteners. The two self-lubricated bushings typically are made from an oil impregnated bronze material.

Figure 2:
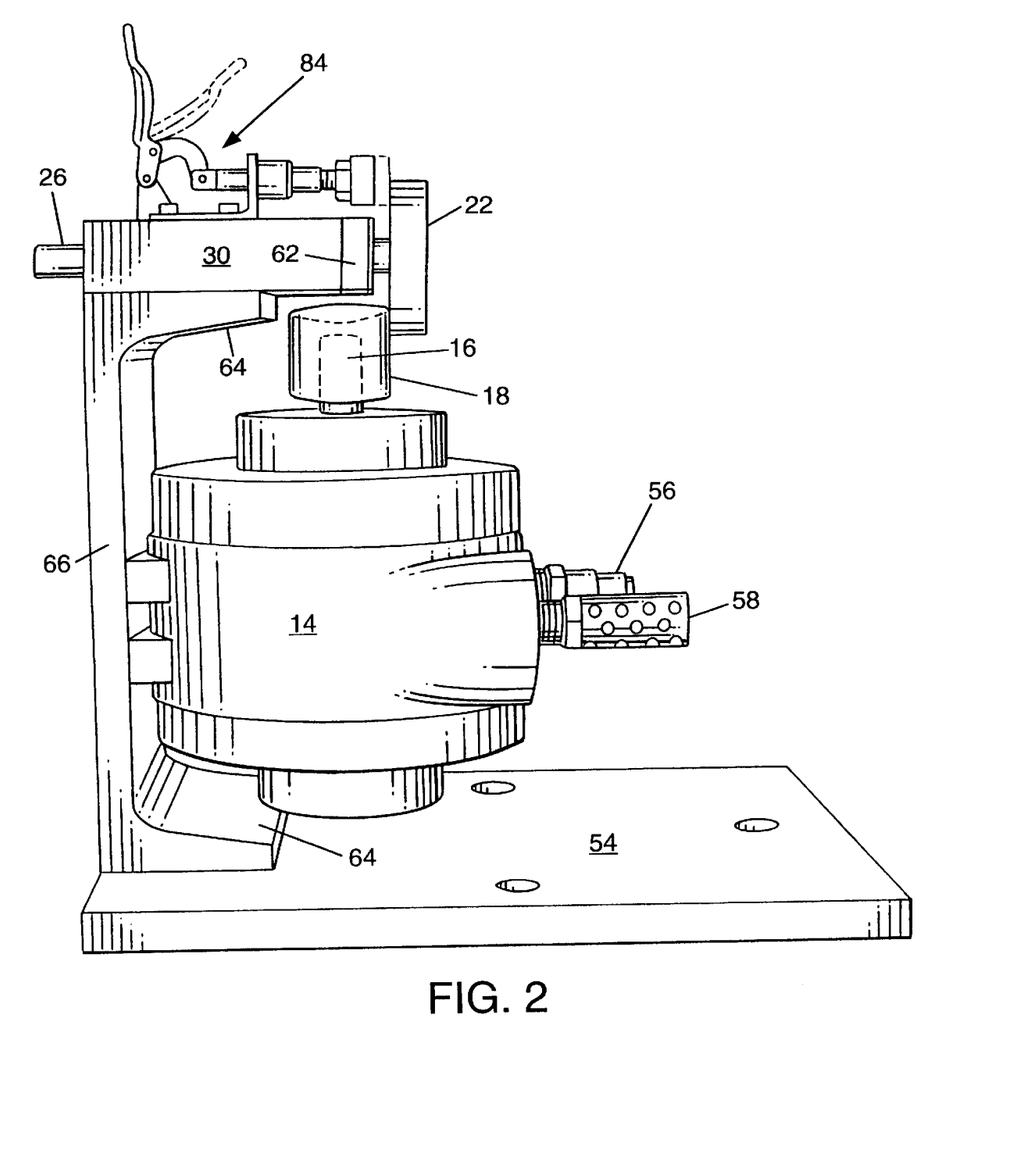
FIG. 2 is a perspective side view showing the main components of the device.

The entire motor and hammer assembly is mounted between flanges 64 of a channel mount 66 by suitable fasteners (not shown). The channel mount 66 is bolted or otherwise secured to a base plate 54 and the interior wall of the housing 12. The hammer 26 extends through a hole 68 in a wall 70 of the housing. As can be seen in FIG. 2, inlet 56 is adapted to be coupled to a source of compressed air to drive the motor 14. The exhaust is discharged from the motor through a muffler 58

Figure 1:
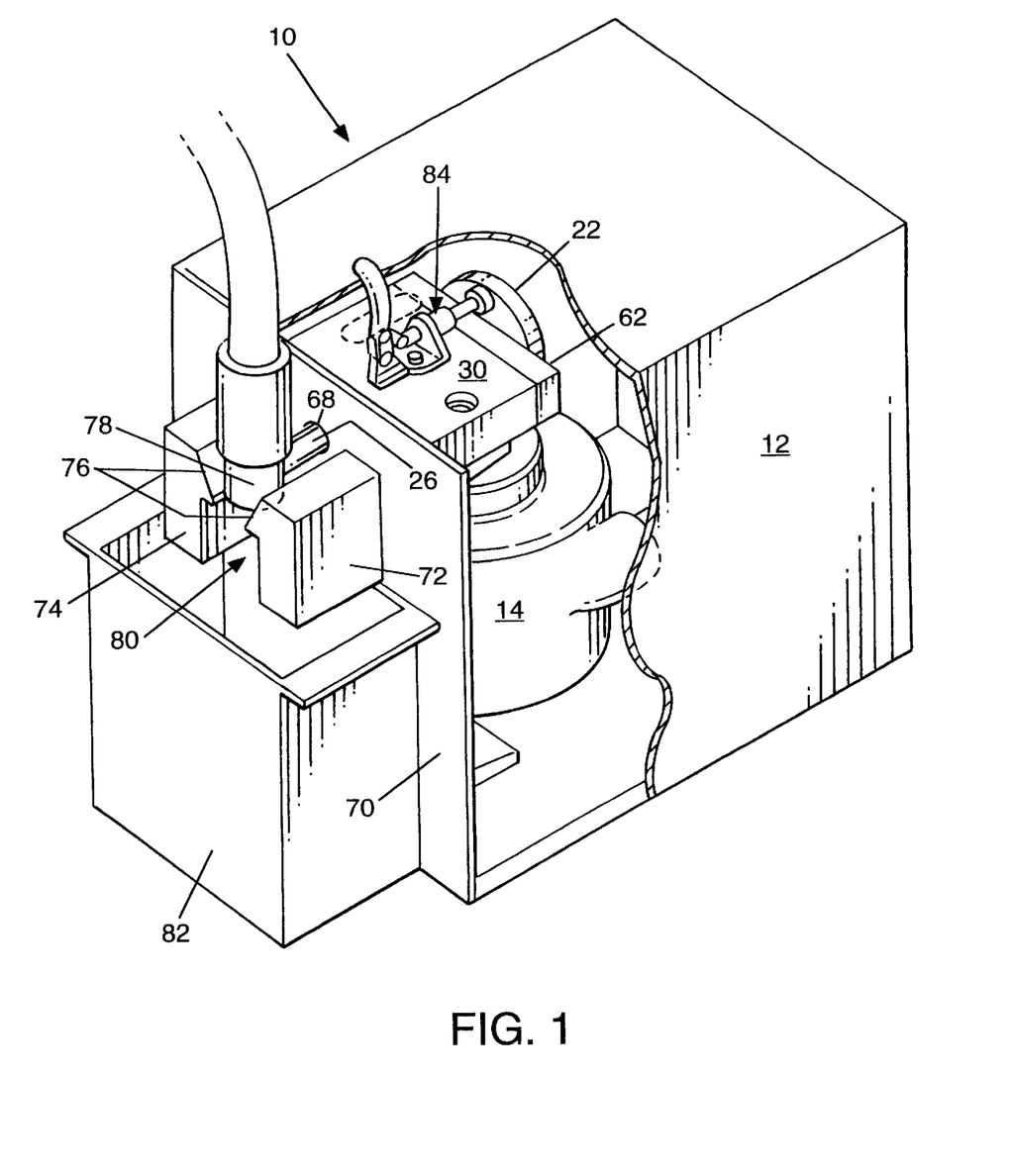
FIG. 1 is a perspective partial cutaway view of the device of the present invention.

Referring to FIG. 1, first and second vee blocks 72, 74 are bolted, or otherwise secured to the outer face of the wall 70. Each of the blocks includes a chamfer 76. The blocks are positioned to form a cradle so that the tip 78 of a welding nozzle is supported and centered between the chamfers in axial alignment with the hammer. The blocks are spaced from one another to accept different types and sizes of welding nozzle tips without the tips slipping through. The opening between the chamfers 76 allows slag to fall into a basket 82 as the slag is dislodged from the welding nozzle tip 78. However, the vee blocks prevent the tip from falling off of the weld torch nozzle notwithstanding the hammer tapping on the tip. The basket is removably secured to the outside of the wall 70 by suitable means, such as studs welded to the wall engaging holes in the basket, or hangers mounted on the basket engaging slots in the wall. Instead of the chamfered vee blocks, an inverted truncated conical holder could be used with the loosened slag falling through the opening in the apex of the cone into the basket.

Referring now to FIGS. 5A and 5B, the device includes a simple but effective means for insuring proper placement of a nozzle tip into the blocks so that the hammer impact is effective without damaging the tip. The device includes a manually operated toggle clamp 84 mounted on top of the hammer housing 30, secured thereto by an angle bracket 86 and machine screws 88. A rod 90 or spindle plunger is mounted in sleeve 92. One end of the rod 90 is connected to the handle 94 which is pivotally mounted to bracket 100 so as to provide sufficient leverage to enable the operator to move the hammer against the resistance of the compression spring 34. The other end of the rod has a screw-adjustable pusher 102. The toggle is movable between a 'training' position and a 'run' position. When the toggle is moved to the 'training' position', the pusher 102 presses against the cam follower 22 to cause the impact face 50 of the hammer 26 to retract about ⅛ inch from its fully extended position. The tip of the welding nozzle is then placed against the impact face 50 of the hammer 26. The robot is programmed to return the tip in this precise location during each cleaning cycle. The handle 94 is then returned to the 'run' position. This allows the compression spring to return the cam follower into its normal position in contact with the cam. Instead of using a manually actuated toggle, suitable means could be employed for providing a remote control of the toggle using hydraulics or the like to achieve the same purpose of positioning each new tip before the start of a welding and cleaning cycle using the tip.

Referring now to FIG. 6, another embodiment of the invention is shown. In this second embodiment, the hammer 126 is machined or otherwise fabricated from a single piece of D-2 steel. It comprises a cylindrical shaft with a flange 152 near the first end 142, and the impact face 150 comprising the second end. A groove 139 between the two ends receives a snap ring 141. The hammer housing 130 includes a cylindrical bore 132 to receive the hammer 126. The first end 142 of the hammer 126 is provided with threads 128 to receive a nut 134 to secure the cam follower 122 to the hammer. A flat washer 129 and lock washer 131 are placed between the cam follower and the nut.

The device shown in FIG. 6 is assembled in the following manner. A lubricated sleeve 160 is press fitted into the retaining plate 162. The second end of the hammer is inserted through the sleeve 160 in the retaining plate 162 until the flange 152 contacts the retaining plate. The compression spring 134 is then slipped over the first end 142 of the hammer 126 and is compressed sufficiently to allow a spring stop collar 154 to be abutted against one end of the spring 134, and the snap ring 141 to be slipped into the groove 139. The cam follower 122 is then secured to the hammer with nut 135 threaded onto the threads 128 at the first end over the disc washer 129 and lock washer 131 to form a subassembly. This subassembly is then inserted into the hammer housing 130 and through the lubricated bushing 138 at the front end of the housing. Lastly, the retaining plate 162 is fastened with machine screws or other fastening means to the housing 130 in the same manner as before.

Figure 7:
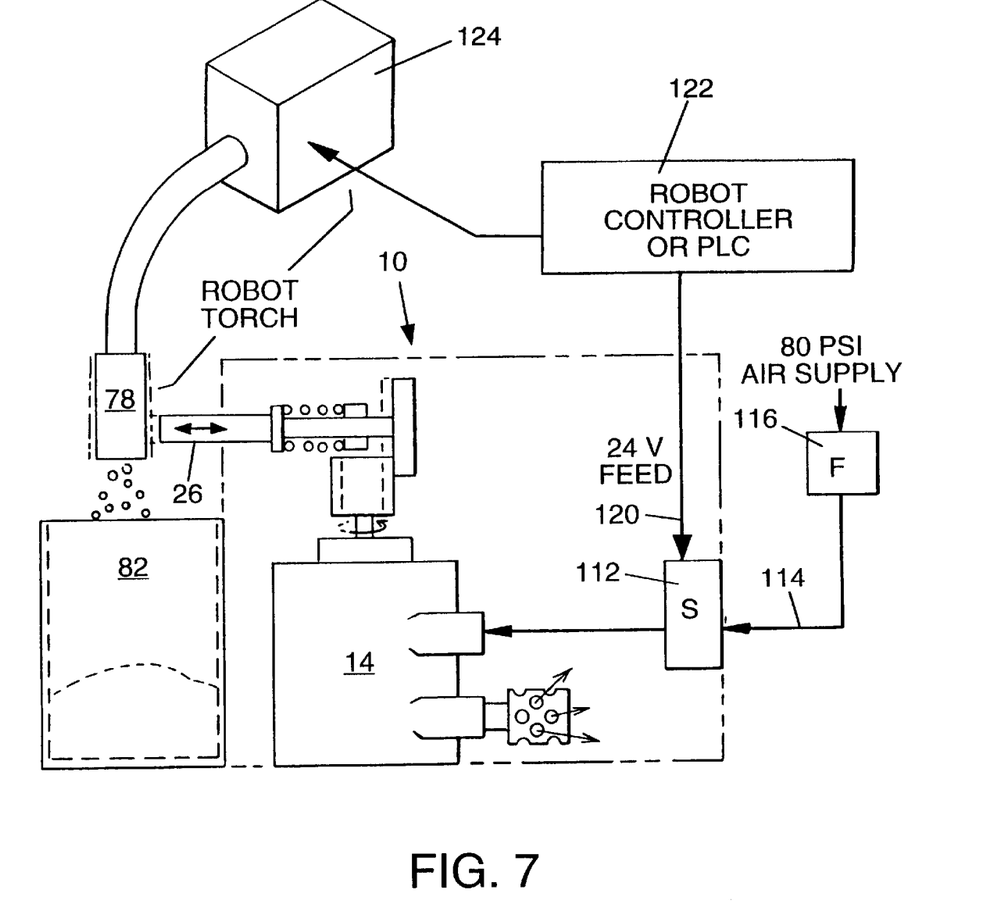
FIG. 7 is a schematic diagram of the overall system.

Turning now to FIG. 7, a schematic block diagram of the connections to the torch cleaner is shown. A robot controller 121 is connected to and controls the robot 124. The controller is programmed to signal the robot to sequentially move the torch tip 78 between a workpiece (not shown) through a slag removal cycle where it positions the tip in proximity to the face of the impact hammer 26. The torch cleaner 10 includes a solenoid valve 112 which actuates the air motor 14 when the tip 78 is properly positioned for cleaning. Pressurized air flows through line 114 to air filter 116 which removes condensate from the line to protect the inner workings of the air motor. The air flows through a flow reducer (not shown) if necessary to regulate the air pressure to the self lubricating air motor 14. The air pressure to the air motor determines the speed of the motor. Speeds between about 200 and 1000 rpm are possible. Using an air pressure of about 80 p.s.i. results in a preferred speed of about 200–300 rpm which has been found to be suitable in the teachings of the present invention. Using a double lobe cam, this speed produces between about 400 and about 600 hammer impacts per minute against the nozzle tip.

The welding sequence is operated by the robotic controller. This controller moves the welding torch from a work piece to the torch cleaner. The torch nozzle is placed into the cradle of the torch cleaner whereupon the air motor is activated to cause the hammer to repeatedly strike the nozzle for a predetermined period of time. The treatment time typically is between about 5 about 10 seconds. This causes the impact face of the hammer to strike the nozzle tip between about 30 and about 100 times, at a rotational speed of 200–300 rpm. This has been generally found to be sufficient to dislodge the slag from the tip of the welding nozzle. The slag falls into the slag basket 82 as previously mentioned.

Apart from the use of the training function, the structure and operation of the welding robotics, the electric arc welders and the welding nozzles do not constitute a part of the present invention. The details of the welding robotics are features that are well known to those persons who are otherwise skilled in the art. They are available from companies such as ABB Robot and Cincinnati Milacron. The MIG welders are available from companies such as Miller Electric Manufacturing Co., Appleton, Wis.; Hobart in Troy, Ohio and Lincoln Electric Company in Euclid, Ohio. Welding nozzles are also available from these companies.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. An apparatus for cleaning slag from the interior of a welding nozzle having a tip, comprising:
    a) a holder for positioning the tip of a welding noble at a stationary location away from a welding site;
    b) a hammer; the fist end of the hammer joined to a cam follower that cooperates with a cam to withdraw the hammer from contact with the nozzle tip;
    c) means for rapidly and repeatedly striking the hammer against the welding nozzle tip to dislodge slag from the nozzle, said means comprising a reciprocating motor, a spring, and a cam driven by the motor to withdraw the hammer after impact, said holder comprising a cradle including a pair of spaced apart blocks having chamfer surfaces between which the nozzle tip is placed for positioning the tip at a fixed position with respect to the hammer; and
    d) a toggle cooperating with programmable robotics, for the repetitive precise placement of a nozzle tip in the holder, said toggle serving to withdraw the impact face of the hammer a slight distance from the impact area, and for placing the nozzle tip against the impact face of the hammer where this position is remembered by the robotics.

2. The apparatus according to claim 1 wherein the motor comprises an air driven motor capable of rotating the cam at a speed between about 200 and about 2,000 rpm.

3. The apparatus according to claim 2 wherein the cam comprises a double lobe, fast-fall cam.

4. The apparatus according to claim 1 wherein the spring is in compression when the hammer is withdrawn from contact with the nozzle tip.

5. An apparatus according to claim 1 further including a basket beneath the blocks to collect slag dislodged from the nozzle tip by the hammer.

6. The apparatus according to claim 1 further including a housing containing said motor, the impact face of said hammer extending through a hole in a wall of the housing and centered between the two spaced apart blocks, said blocks mounted on the outside of said wall on either side of said hole.

7. The apparatus according to claim 6 wherein the hammer includes a cylindrical shaft joining said first end and said second end.

8. The apparatus according to claim 7 wherein the cylindrical shaft is slidably positioned in a bore hole, said bore hole further including the spring held in compression when the hammer is withdrawn by the cam actuating against the cam follower after each impact with the nozzle tip.

9. The apparatus according to claim 7 wherein the cradle is adapted to hold the nozzle tip centered between the chamfer surfaces in alignment with the axis of the cylindrical shaft of the hammer.

10. The apparatus according to claim 1 wherein said toggle comprises a lever and a pusher whereupon movement of the lever into a 'training' position actuates the pusher to move the impact face of the hammer away from the impact area.

* * * * *

UNITED STATES PATENT AND TRADEMARK OFFICE
CERTIFICATE OF CORRECTION

PATENT NO. : 6,295,708 B1  
DATED : October 2, 2001  
INVENTOR(S) : Dennis A. Spaid, James D. Floro & Robin Longenecker Page 1 of 1

It is certified that error appears in the above-identified patent and that said Letters Patent is hereby corrected as shown below:

<u>Column 5, claim 1,</u>  
Line 42, after "the", first occurrence, change "fist" to -- first --.

Signed and Sealed this

Twenty-sixth Day of March, 2002

*Attest:*

JAMES E. ROGAN  
*Director of the United States Patent and Trademark Office*

*Attesting Officer*